United States Patent [19]
Kathawala

[11] 3,872,119
[45] Mar. 18, 1975

[54] 1-SUBSTITUTED-5,6-DIHYDRO-PYRROLO(3,2,1-IJ)QUINAZOLIN-3(3H)-ONES

[75] Inventor: Faizulla G. Kathawala, West Orange, N.J.

[73] Assignee: Sandoz-Wander, Inc., Hanover, N.J.

[22] Filed: Mar. 26, 1973

[21] Appl. No.: 344,736

[52] U.S. Cl.... 260/251 A, 260/256.4 Q, 260/295 B, 260/326.13 R, 260/326.14 R, 424/251
[51] Int. Cl............................................ C07d 57/12
[58] Field of Search.................. 260/251 A, 256.4 Q

[56] References Cited
UNITED STATES PATENTS
3,709,887   1/1973   Cooke et al. .................... 260/251 A

*Primary Examiner*—James A. Patten
*Attorney, Agent, or Firm*—Gerald D. Sharkin; Richard E. Vila; Thomas C. Doyle

[57] ABSTRACT

Disclosed are compounds of the general class of 1-aryl-5,6-dihydro-pyrrolo[3,2,1-ij]quinazolin-3(3H)-ones and compounds which are 1-aryl-1,2,5,6-tetrahydro-pyrrolo[3,2,1-ij]quinazolin-3(3H)-ones.
The 5,6-dihydro compounds are prepared by oxidation of the corresponding 1,2,5,6-tetrahydro compounds and the latter are prepared by reaction of a 2,3-dihydro-1-indole carboxamide with an appropriately -substituted or unsubstituted aromatic aldehyde. The pyrrolo[3,2,1-ij] quinazolin-3(3H)-ones have pharmacological activity in animals and are useful as sedative-hypnotics and as sleep inducers.

9 Claims, No Drawings

1-SUBSTITUTED-5,6-DIHYDRO-PYRROLO(3,2,1-IJ)QUINAZOLIN-3(3H)-ONES

DISCLOSURE OF INVENTION

The present invention relates to tricyclic compounds, and more particularly to compounds which are 1-substituted-5,6-dihydro-pyrrolo[3,2,1-ij]quinazolin-3(3H)-ones including compounds which are 1-aryl-1,2,5,6-tetrahydro-pyrrolo[3,2,1-ij]quinazolin-3(3H)-ones. The invention also relates to preparation of such compounds from indoline-carboxamide intermediates and to methods and compositions utilizing the pharmacological activities of said tricyclic compounds.

The compounds of this invention may be represented by the formula

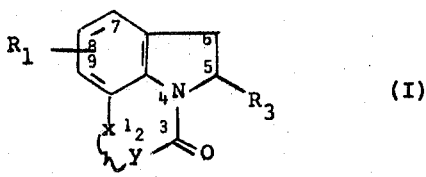

wherein $\widehat{xy}$ is

or

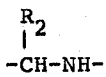

$R_1$ is hydrogen, mono- or dialkylamino in which the alkyl group contains 1 to 3 carbon atoms, halo of atomic weight 18 to 80, amino, nitro, alkyl or alkoxy of 1 to 3 carbon atoms or trifluoromethyl, $R_2$ is pyridyl or phenyl and may be mono- or disubstituted by halo of atomic weight 18 to 80, alkyl of 1 to 3 carbon atoms, alkoxy of 1 to 3 carbon atoms, alkoxy carbonyl in which the alkoxy group contains 1 to 3 carbon atoms or trifluoromethyl, $R_3$ is hydrogen, or alkyl of 1 to 5 carbon atoms.

The compounds of formula I in which $\widehat{xy}$ is

i.e. the compound of formula

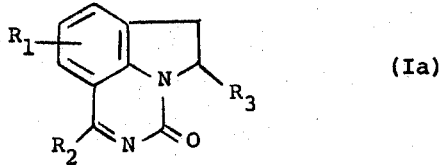

wherein $R_1$, $R_2$ and $R_3$ are as defined above, can be prepared by oxidizing a compound of formula I in which $\widehat{xy}$ is

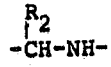

i.e. a compound of the formula

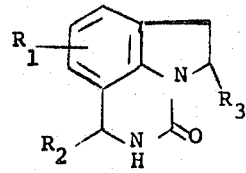

wherein $R_1$, $R_2$ and $R_3$ are as defined above.

The preparation of compounds Ia from compounds Ib by oxidation may be conveniently carried out in an inert organic solvent at temperatures in the range of 0°C to 120°C. typically 15°C. to 100°C. The oxidizing agents which may be employed are of known type suitable for converting an organic amino moiety to an imino moiety. Representatives of such oxidizing agents are the alkali metal permanganates, such as sodium or potassium permanganate, manganese dioxide, dichlorodicyanobenzoquinone and mercuric acetate. Dehydrogenation may also be employed using, for example, palladium on carbon in tetralin.

The compounds of formula Ib may be obtained by reacting a compound of formula

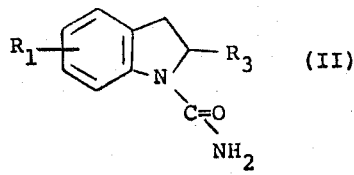

with a compound of the formula
$$R_2CHO \quad \text{III.}$$ 
wherein $R_1$, $R_2$ and $R_3$ are as defined, at elevated temperatures.

The reaction of compound II with compound III is carried out at elevated temperatures in the range of 30°C. to 150°C., preferably 50°C. to 120°C. The reaction is suitably carried out in the presence of an acid as catalyst and dehydrating agent which is otherwise non-reactive with compounds II and III, for example, an inorganic mineral acid, such as hydrochloric acid (hydrogen chloride in an aromatic solvent) or polyphosphoric acid or an organic acid such as trifluoroacetic acid, oxalic acid or an arylsulfonic acid or an alkylsulfonic acid such as benzenesulfonic acid, p-toluenesulfonic acid and methanesulfonic acid, preferably polyphosphoric acid. The amount of acid catalyst, other than polyphosphoric acid, is desirably controlled at a minor amount not substantially exceeding about one molar equivalent based on the compound II, and is most preferably a minor catalytic amount between 0.005 to 0.5 molar equivalent based on the urea. The conducting of the reaction under anhydrous or nearly anhydrous conditions is important to obtaining effective results. The reaction may be carried out in an organic solvent which may be any of several conventional organic solvents providing an inert reaction medium, preferably an aromatic solvent such as benzene and the like. However, when polyphosphoric acid is used as catalyst a substantial excess is preferably employed since this compound also serves as a suitable reaction medium. Depending upon known factors such as reaction temperature, etc., the reaction may take typically between 1 to 50 hours. The reaction product may contain substantial amounts of compound Ia in addition to compound Ib, depending on the reaction conditions and catalyst employed.

After isolation of this reaction product from the reaction mixture by conventional means, the compound Ib may be oxidized as discussed above, optionally after separating the compound Ia.

It was postulated that the preparation of compounds Ib by reaction of compounds II and III proceeds through an intermediate of the formula A:

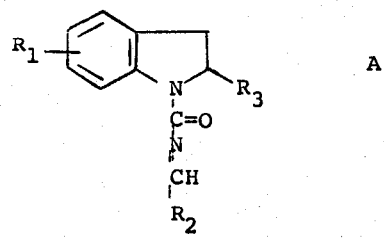

wherein $R_1$, $R_2$ and $R_3$ are as defined. In experimentation conducted with reference to the more preferred embodiments of the invention it was evident that an intermediate of formula A had been formed, but that the reaction may directly produce compounds Ib in good yields in essentially a single state operation when conducted under the preferred conditions.

The compounds of formula II may be prepared by subjecting a compound of formula IV

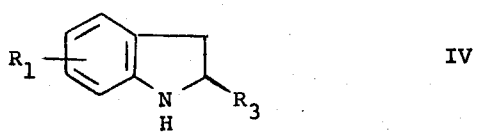

in which $R_1$ and $R_3$ are as defined, to reaction with isocyanic acid which is provided in a conventional manner by forming in situ from an alkali metal isocyanate and a suitable acid such as lower aliphatic carboxylic acid, preferably acetic acid. The reaction may be suitably carried out at temperatures in the range of 10°C. to 50°C. and in an organic solvent medium which may be conveniently a lower aliphatic carboxylic acid such as excess acetic acid.

The reaction product of formula II may be isolated by working up by conventional procedures.

The compounds of formula III are known.

The compounds of formula IV are known or can be produced according to known procedures, e.g. J. Org. Chem. 20 1538 (1955), Bull Soc. Chem. France 4 1335-42 (1966) and Chem. Ber. 93 1496-1506 (1960).

The compounds of formula I are useful because they exhibit pharmacological activity in animals. In particular, they are useful as sedative-hypnotics as indicated by behavior tests in mice dosed orally with 50 to 100 mg/kg, i.p. using a 30 word adjective check sheet, as disclosed by Irwin, (Gordon Research Conference, Medicinal Chemistry 1959) and by the inhibition of seizure in mice dosed with 30-300 mg/kg i.p. followed one hour later with 50 mg/kg i.p. N-sulfamoylazepine. They are also useful as sleep-inducers as indicated by sleep studies in Cebus monkeys having chronically implanted electrodes and dosed with 30 mg/kg of test compound intraperitoneally every seven days, brain readings being obtained via a ten or sixteen channel electroencephalograph, and gross behavior being monitored on closed circuit television and video tape recordings.

The dosage of active ingredient employed may vary depending on the particular compound employed, the method of administration and the severity of the condition being treated. However, in general, satisfactory results are obtained when the compounds (I) are administered at a daily dosage of from about 2 milligrams to about 200 milligrams per kilogram of animal body weight, given as a single dose or in divided doses, or sustained release forms. When used as a sedative-hypnotic, divided doses 2 to 4 times a day are preferred, whereas a single dose at bedtime is given as a sleep-inducer. For most large mammals, the total daily dosage is from about 150 to about 2,500 milligrams. Dosage forms suitable for internal use comprise from about 40 to about 1,500 milligrams of the active compound in intimate admixture with a solid or liquid pharmaceutically acceptable carrier or diluent.

The compounds of formula I may be administered orally in such forms as tablets, dispersible powders, granules, capsules, syrups and elixirs, and parenterally as solutions, suspensions, dispersions, emulsions, and the like, e.g., a sterile injectable aqueous suspension. The compositions for oral use may contain one or more conventional adjuvants, such as sweeteners, flavorants, colorants and preservatives. Tablets may contain the active ingredient in admixture with conventional pharmaceutically acceptable excipients, e.g., inert diluents, such as calcium phosphate, terra alba, lactose and talc, granulating and disintegrating agents, e.g., starch and alginic acid, binding agents, e.g., starch, gelatin, polyvinyl pyrrolidone and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium phosphate and kaolin. The sterile injectable compositions are formulated as known in the art and may contain appropriate dispersing or wetting agents and suspending agents identical or similar to those mentioned above. These pharmaceutical preparations may contain from 1% up to about 90% of the active ingredient in combination with the carrier or adjuvant.

The preferred pharmaceutical compositions from the standpoint of preparation and ease of administration are solid compositions particularly hard-filled capsules and tablets.

Tablets and capsules containing the ingredients indicated below may be prepared by conventional techniques and are useful as sedative-hypnotics at a dose of one tablet or capsule 2 to 4 times a day.

| Ingredient | Weight (mg) | |
|---|---|---|
| | Tablet | Capsule |
| 1-p-fluorophenyl-8-chloro-5,6-dihydro-pyrrolo[3,2,1-ij]quinazolin-3(3H)-one | 100 | 100 |
| tragacanth | 10 | — |
| lactose | 147.5 | 200 |
| corn starch | 25 | — |
| talcum | 15 | — |
| magnesium stearate | 2.5 | — |
| Total | 300.0 mg | 300.0 mg |

The following representative pharmaceutical compositions are formulated with the indicated amount of active agent using conventional techniques.

| | Injectable Solution Weight % | Oral Liquid Weight % |
|---|---|---|
| 1-p-fluorophenyl-8-chloro-5,6-dihydro-pyrrolo[3,2,1-ij]quinazolin-3(3H)-one | 10 | 0.5 to 3.5 |
| sodium alginate | 0.5 | — |
| sodium benzoate | — | 0.1 to 0.5 |
| simple syrup | — | 30 to 70 |
| lecithin | 0.5 | — |
| sodium chloride | as desired | |
| flavor | — | as desired |
| color | — | as desired |
| sorbitol solution 70% USP | — | 10 to 30 |
| buffer agent to adjust pH for desired stability | as desired | as desired |
| water | to desired volume | to desired volume |

Compounds of this invention, e.g. 1-p-fluorophenyl-8-chloro-5,6-dihydro-pyrrolo[3,2,1-i.j.]quinazolin-3[3H]-one and 1-pyridyl-8-chloro-1,2,5,6-tetrahydo-pyrrolo-[3,2,1-i.j.]quinazolin-3[3H]-one also exhibit anti-inflammatory activity as indicated by the Carrageenan-induced edema and adjuvant arthritis tests and/or analgesic activity as indicated by the Randall and Selitto test or the writhing test.

The following example showing preparation of compounds of this invention are for illustration only.

EXAMPLE 1

Step A: 5-chloroindoline-1-carboxamide

A mixture of 9.6 g. 5-chloroindoline, 10.2 g. potassium cyanate and 50 ml. glacial acetic acid is stirred at room temperature for 2 hours. The precipitate is filtered, washed with 2N HCl and then with water and air dried. The resulting product is taken up in refluxing methanol, filtered and the filtrate concentrated to a solid which is recrystallized from chloroform to give the title compound, m.p. 148°–152°C.

Step B: 1-m-fluorophenyl-8-chloro-1,2,5,6-tetrahydropyrrolo[3,2,1-ij]quinazolin-3(3H)-one A mixture of 5 g. 5-chloroindole-1-carboxamide, 10 g. m-fluorobenzaldehyde and 160 g. polyphosphoric acid is vigorously stirred at 135°C. for 2 ½ hours. The reaction mixture is diluted with 600 ml. water and extracted with methylene chloride. The combined organic layers are washed with 2N sodium chloride, dried over anhydrous sodium sulfate and concentrated under reduced pressure. There is obtained a crude product which is a mixture of the title compound and the corresponding 5,6-dihydro derivative.

Step C: 1-m-Fluorophenyl-8-chloro-5,6-dihydro-pyrrolo[3,2,1-ij]quinazolin-3(3H)-one A mixture of 9.4 g. dichlorodicyanobenzoquinone and 12.4 g. of the crude product mixture of Step B in 450 ml. dioxane is stirred overnight at room temperature. The reaction mixture is filtered and the filtrate concentrated under reduced pressure. The resulting orange oil is taken up in 150 ml. chloroform, washed with 2N sodium hydroxide and with saturated sodium chloride solution, dried over anhydrous sodium sulfate and concentrated under reduced pressure. The resulting yellow powder is crystallized from methanol to give a yellow microcrystalline solid which is dried in vacuo at 70°C to give the title product, m.p. 159°–160°C.

EXAMPLE 2

Step A: 5-Bromoindole-1-carboxamide

To a solution of 37.5 g. 5-bromindoline in 100 ml. glacial acetic acid is added 30.8 g. potassium cyanate over a period of 30 minutes with stirring and water bath cooling. The resulting white suspension is washed with water, dissolved in chloroform and dried over anhydrous sodium sulfate. This is concentrated to the cloud point and allowed to crystallize to give the title compound, m.p. 157°–158°C.

Step B: 1-phenyl-8-bromo-5,6-dihydro-pyrrolo[3,2,1-ij]quinazolin-3(3H)-one

A mixture of 3.0 g. 5-bromoindoline-1-carboxamide, 3.18 g. benzaldehyde, 3 g. polyphosphoric acid and 50 ml. toluene is refluxed with vigorous stirring for 1 hour. The reaction mixture is poured into a mixture of ice and 2N NaOH and extracted with ethyl acetate. The bright yellow organic layers are combined, dried over anhydrous sodium sulfate and concentrated under reduced pressure to give a yellow oil. Trituration of this oil under pentane gives a yellow gum which when triturated under 50 ml. absolute ether gives a yellow crystalline solid. Crystallization and recrystallization from boiling methanol yields the title compound, m.p. 90°–92°C.

EXAMPLE 3

1-Phenyl-8-chloro-1,2,5,6-tetrahydro- and -1,2-dihydro-pyrrolo[3,2,1-i.j]-quinazolin-3[3H]-ones.

To a suspension of 21 g. 5-chloroindoline-1-carboxamide in 150 ml. polyphosphoric acid at 115°C. is added 21.2g benzaldehyde. After 15 minutes the reaction mixture is removed from the source of heat and rendered basic with ice cold 25% NaOH. The resulting mixture is extracted 4 times with 200 ml. portions chloroform. The combined organic layers are washed with 2N NaCl, dried over anhydrous sodium sulfate and concentrated under reduced pressure to give a brown oil. The oil is chromatographed in a silica gel column. The 7th and 8th fractions are each stirred in benzene for 30 minutes, filtered and dried in vacuo at 70°C. to give, respectively 1-phenyl-8-chloro-1,2,5,6-tetrahydro-pyrrolo[3,2,1-ij]quinazolin-3(3H)-one, m.p. 220°–222°C. and 1-phenyl-8-chloro-5,6-dihydro-pyrrolo [3,2,1-ij]quinazolin-3(3H)-one, m.p. 137°–142°C.

EXAMPLE 4

1-Pyridyl-8-chloro-1,2,5,6-tetrahydro-pyrrolo[3,2,1-ij]quinazolin-3(3H)-one

To 200 g. stirred polyphosphoric acid at 125°C. is added 28.6 g. 4-pyridinecarboxaldehyde followed by 17.5 g. 5-chloroindoline-1-carboxamide. After 2½ hours the reaction is quenched with 300 ml. 2N NaOH and water is added to give a total volume of 1,600 ml. This is filtered and the residue dried to give a light pink solid which is dried in vacuo to give the title compound, m.p. 212-217°C.

1-pyridyl-8-chloro-5,6-dihydro-pyrrolo[3,2,1-ij]quinazolin-3(3H)-one.

A mixture of 3 g. of the 1,2,5,6-tetrahydro product of the preceding step, 2.5 g. dichlorodicyanobenzoquinone and 75 ml. dioxane are stirred overnight at room temperature. The resulting mixture is filtered over Celite and the filtrate concentrated under reduced pressure and then taken up in chloroform, washed with NaOH and saturated NaCl, dried and concentrated under reduced pressure to give a yellow powder. The powder is triturated under ether, filtered and dried to give the title compound, m.p. 237°-238°C.

EXAMPLES 5-8

Following the procedures of one or more of the preceding examples, the following compounds are obtained: 1-p-fluorophenyl-8-chloro-5,6-dihydro-pyrrolo[3,2,1-ij]quinazolin-3(3H)-one, m.p. 236°-238°C. (from benzene).

1-o-fluorophenyl-8-chloro-5,6-dihydro-pyrrolo[3,2,1-ij]quinazolin-3(3H)-one, m.p. 252°-254°C. (from ether).

1-p-methoxycarbonylphenyl-8-chloro-5,6-dihydro-pyrrolo[3,2,1-ij]quinazolin-3(3H)-one, m.p. 217°-218°C.

1-o,o'-dichlorophenyl-8-chloro-1,2,5,6-tetrahydro-pyrrolo[3,2,1-ij]quinazolin-3(3H)-one, m.p. 265°-267°C. (from ethyl acetate).

What is claimed is:

1. A compound of the formula (I)

wherein $\overset{\frown}{x\ y}$ is $$-\overset{R_2}{\underset{|}{C}}=N-$$

or $$-\overset{R_2}{\underset{|}{CH}}-NH-$$

$R_1$ is hydrogen, mono- or dialkylamino in which the alkyl group contains 1 to 3 carbon atoms, halo of atomic weight 18 to 80, amino, nitro, alkyl or alkoxy of 1 to 3 carbon atoms or trifluoromethyl, $R_2$ is pyridyl or phenyl and may be mono- or disubstituted by halo of atomic weight 18 to 80, alkyl of 1 to 3 carbon atoms, alkoxy of 1 to 3 carbon atoms, alkoxy carbonyl in which the alkoxy group contains 1 to 3 carbon atoms or trifluoromethyl, $R_3$ is hydrogen, or alkyl of 1 to 5 carbon atoms.

2. A compound of claim 1 of the formula

3. A compound of claim 1 of the formula

4. A compound of claim 1 wherein $R_1$ is in the 8 position.

5. A compound of claim 1 wherein $R_1$ is halo.

6. A compound of claim 5 wherein $R_1$ is chloro.

7. A compound of claim 1 wherein $R_3$ is hydrogen.

8. A compound of claim 1 wherein $R_2$ is phenyl or substituted phenyl.

9. 1-p-fluorophenyl-8-chloro-5,6-dihydro-pyrrolo[3,2,1-ij]quinazolin-3(3H)-one.

* * * * *